United States Patent [19]
Inose et al.

[11] 3,811,110
[45] May 14, 1974

[54] ARRANGEMENT FOR NORMALIZING TWO-DIMENSIONAL PATTERN

[76] Inventors: Fumiyuki Inose; Yuzo Kita, both of Kokubunji, Japan

[22] Filed: July 24, 1972

[21] Appl. No.: 274,422

[30] Foreign Application Priority Data

July 23, 1971 Japan .............................. 46-54614

[52] U.S. Cl. .................... 340/146.3 H, 235/92 SH, 340/146.3 MA, 340/174 M

[51] Int. Cl. ............................................ G06k 9/04

[58] Field of Search ........... 340/146.3 MA, 146.3 E, 340/146.3 Y, 146.3 H, 172.5, 174 R, 173 R, 174 M, 174 TF; 235/92 SH, 92 ME

[56] References Cited

UNITED STATES PATENTS

| | | | |
|---|---|---|---|
| 3,760,357 | 9/1973 | Inose et al. | 340/146.3 H |
| 3,699,519 | 10/1972 | Campbell | 340/146.3 E |
| 3,613,082 | 10/1971 | Bouchard | 340/146.3 MA |
| 3,069,079 | 12/1962 | Steinbuch et al. | 340/146.3 Y |

OTHER PUBLICATIONS

Casey et al., "Parallel Linear Transformations on Two-Dimensional Binary Images," IBM Tech. Disclosure Bulletin, Vol. 13, No. 11, 4/1971, pp. 3267–3268.

*Primary Examiner*—Paul J. Henon
*Assistant Examiner*—Leo H. Boudreau
*Attorney, Agent, or Firm*—Craig and Antonelli

[57] ABSTRACT

An arrangement for normalizing a two-dimensional pattern, wherein a pattern input unit and a pattern detecting unit are respectively provided along the X-axis and Y-axis of a memory array which provides a shift function in the X- and Y-directions, and wherein said pattern detecting unit is arranged at certain angles with respect to the X-axis and Y-axis of said memory array, whereby the two-dimensional pattern stored in said memory array is successively shifted in the X-direction and Y-direction so as to impart rotation to said pattern.

15 Claims, 9 Drawing Figures

ARRANGEMENT FOR NORMALIZING TWO-DIMENSIONAL PATTERN

BACKGROUND OF THE INVENTION

1. Field of the Invention

The present invention relates to an arrangement for normalizing a two-dimensional pattern, and more particularly to a rotating system for a two-dimensional pattern which is effectively utilized for the preprocessing of the pattern recognition.

2. Description of the Prior Art

Pattern recognition processing requires a preprocessing which normalizes the input pattern prior to the recognition processing thereof. One form of the preprocessing includes a rotating of the input pattern. It is not impossible in principle to accomplish the rotation of the general two-dimensional pattern (spatial pattern), such as a figure character or numeral, by means of hardware in the form of an IC, LSI, etc. In actuality, however, the realization of this operation is nearly impossible in view of the required reliability, productivity, complexity of wiring, etc. On the other hand, if it is intended to perform the rotation on the basis of software by a computer, much time is taken. This is also extremely difficult to achieve in actual practice. Accordingly, despite the necessity for the preprocessing operation prior to pattern recognition, with the processing of this type it has heretofore been impossible to avoid the necessity to rely on methods which exhibit very poor efficiency.

SUMMARY OF THE INVENTION

The principal object of the present invention is to provide an arrangement which can perform the preprocessing operation including the rotating of a two-dimensional pattern comparatively simply, inexpensively and with high reliability.

Another object of the present invention is to provide an arrangement constructed such that an input two-dimensional pattern is first shifted along the X-axis in a memory array, is read out by a detecting unit having an angle of $\theta$ with respect to the Y-axis, is next rewritten in the memory array, is then shifted along the Y-axis in the memory array, and is then read out by a detecting unit also disposed at an angle of $\theta$ with respect to the X-axis, to finally obtain a two-dimensional pattern generally rotated by $\theta$.

The other objects, features and advantages of the invention will be apparent from the following detailed description when read in conjunction with the accompanying drawings.

PREFERRED EMBODIMENTS OF THE INVENTION

Figure 1:
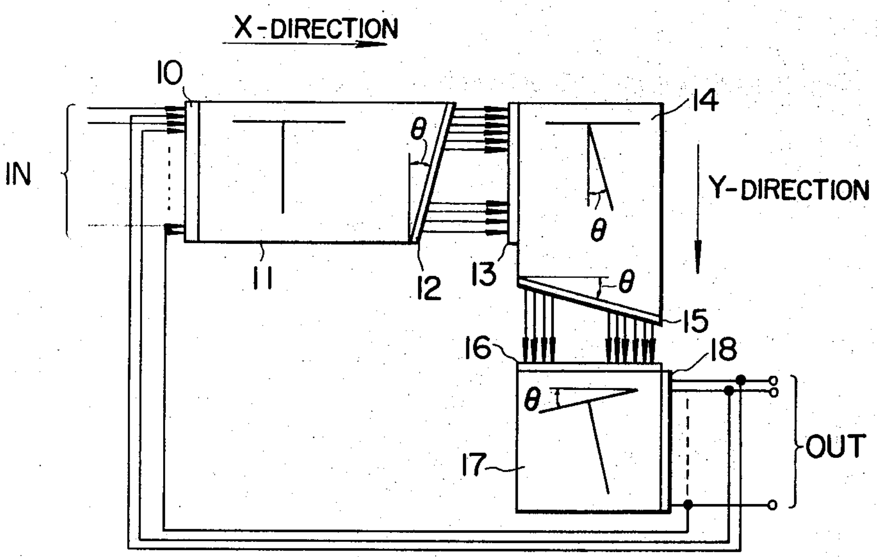
FIG. 1 is a schematic diagram illustrating the principle of the present invention.

FIG. 1 is a diagram explaining the principle of the present invention. Referring to the figure, a memory array 11 has the function of shifting stored information in the X-direction, a memory array 14 has shift functions in the X- and Y- directions in order to conduct X-directional writing and Y-directional reading, and a memory array 17 also has shift functions in the X- and Y-directions in order to conduct Y-directional writing and X-directional reading. Input units 10, 13 and 16 and detecting units 12, 15 and 18 are respectively coupled to input and output parts of the memory arrays 11, 14 and 17. In particular, the detecting unit 12 of the memory array 11 is coupled so as to be disposed at an angle $\theta$ with respect to the Y-axis, while the detecting unit 15 of the memory array 14 is coupled so as to be similarly disposed at an angle $\theta$ with respect to the X-axis. IN represents input terminals of the circuit arrangement, and OUT represents output terminals thereof.

The respective trains of parallel bits of a two-dimensional pattern fed to the input terminals IN are successively written in the memory array 11 from the input unit 10. The original pattern (as an example, a character pattern T is illustrated) is shifted in the X-direction in the array 11, and is read out from the detecting unit 12 at the right end in a successive manner. Signals read out from the unit 12 are again written in the next array 14 via the input unit 13. Since, herein, the detecting unit 12 of the array 11 is disposed at an angle $\theta$ with respect to the Y-axis, a deformed pattern as shown in which the component of the original pattern in the Y-axial direction is rotated by the angle $\theta$ is written in the array 14.

The deformed pattern is shifted in the Y-direction in the array 14, is read out from the detecting unit 15 in a successive manner, and is written in the next array 17. Since, however, the detecting unit 15 of the array 14 is disposed at an angle $\theta$ with respect to the X-axis, the component of the pattern in the X-axial direction is subjected to a rotation by the angle $\theta$ this time. Eventually, a pattern transferred with respect to the original pattern so as to be generally rotated by $\theta$ as in the figure is written in the array 17. The pattern in the array 17, which has been subjected to the predetermined rotations, is shifted in the X-direction in the array 17, and is applied from the detecting unit 18 to the output terminals OUT in a successive manner. If, herein, the output pattern is fed-back through the input unit 10 to the array 11, is again passed through the arrays 11, 14 and 17 to be applied to the output terminals OUT, and this procedure is repeated $n$ times, then a pattern with the original pattern rotated by $n \cdot \theta$ is obtained.

Figure 2:
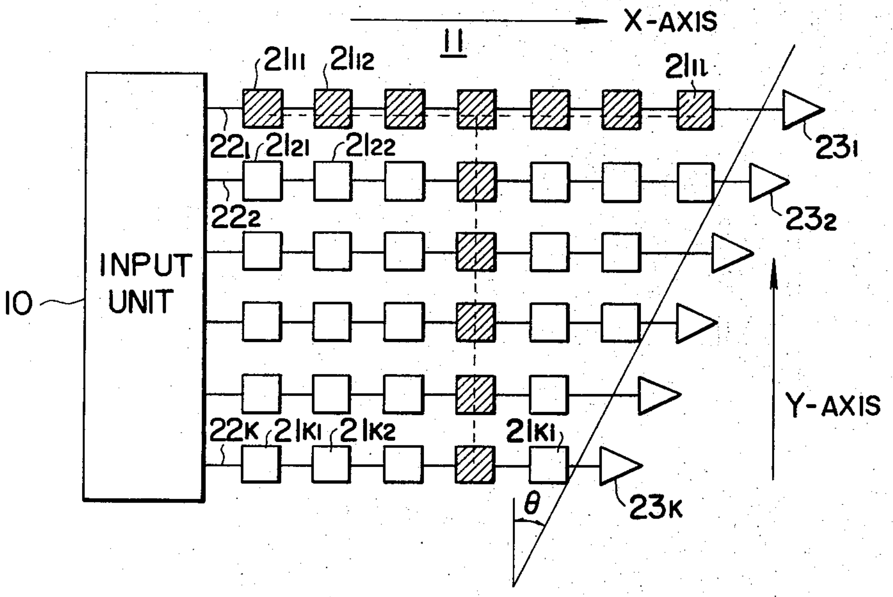
FIGS. 2 to 4 are detailed schematic views of parts of the respective memory arrays used in the arrangement of FIG. 1.
Figures 3, 4:
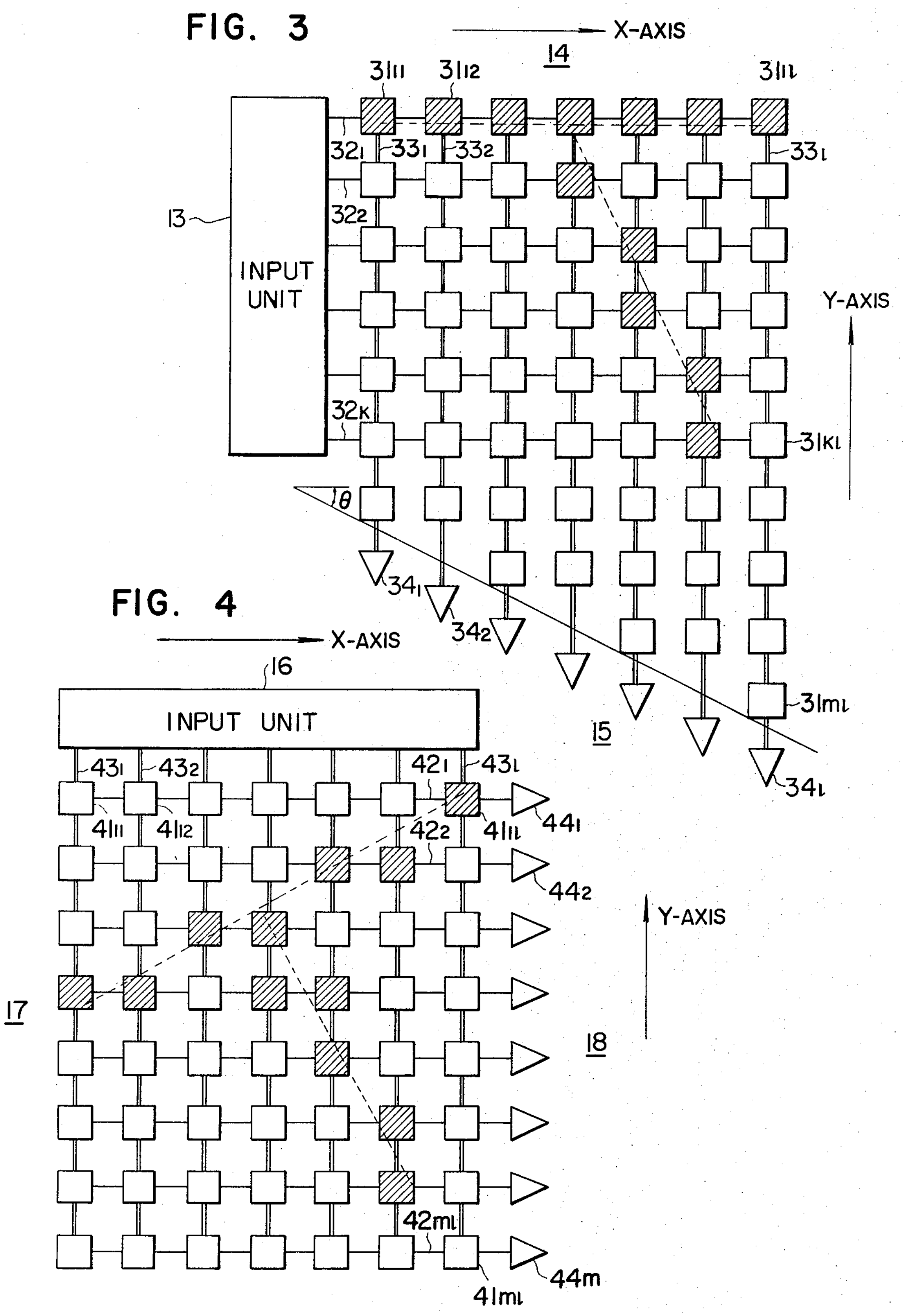

FIGS. 2 to 4 are views in which the respective memory arrays in FIG. 1 are partially enlarged, and in which the same parts as in FIG. 1 are identified with the same symbols.

Referring to FIG. 2, the memory array 11 comprises a number of memory cells $\mathbf{21}_{11}$, $\mathbf{21}_{12}$ . . . $\mathbf{21}_{kn}$, of any conventional configuration, such as a binary storage element, which are arrayed in the form of a matrix. Groups of memory cells forming rows in the X-axial direction are respectively connected in series with shift lines $22_1, 22_2 \ldots 22_k$. The shift lines of the respective rows are connected at the left end to the input unit 10, while they are connected at the right end to the detecting unit 12. Reading elements $23_1, 23_2 \ldots 23_k$ of the respective rows forming the detecting unit 12 have an inclination of $\theta$ with respect to the Y-axis. In other words, a group of memory cells forming the output part of the memory array 11 are arrayed at an inclination of $\theta$ with respect to the Y-axis.

The original pattern is successively written from the input unit 10 into the memory array 11 in the parallel bit system. It is now assumed that the character pattern T is written in the memory array 11, and that hatched memory cells in the figure signify a state "1", while blank cells a state "0". The pattern in the memory array 11 is gradually shifted in the X-direction, and the signals are detected by the corresponding elements $23_1, 23_2 \ldots 23_k$ of the detecting unit 12. In this case, the component of the pattern in the X-axial direction is not subjected to any deformation, and only the component in the Y-axial direction is subjected to the deformation of the angle $\theta$. The pattern read out from the detecting unit 12 is written in the succeeding memory array 14 (refer to FIG. 1).

FIG. 3 is a detail plan view of the memory array 14, which comprises a number of memory cells $31_{11}, 31_{12} \ldots 31_{ml}$ arrayed in the form of a matrix as in the array 11 in FIG. 2. Most of the groups of memory cells forming rows in the X-axial direction are respectively connected in series with X-axial shift lines $32_1, 32_2 \ldots 32_k$. The group of shift lines are connected at the left end to the input unit 13, while they terminate at the right end with the memory cells $31_{1l}, 31_{2l} \ldots 31_{kl}$. On the other hand, groups of memory cells forming columns in the Y-axial direction are respectively connected with Y-directional shift lines $33_1, 33_2 \ldots 33_l$. The group of shift lines are connected at the upper end to the memory cells $31_{11}, 31_{12} \ldots 31_{1l}$, while they are connected at the lower end to the detecting unit 15.

The detecting unit 15 comprises reading elements $34_1, 34_2 \ldots 34_l$ which are connected to the respective Y-directional shift lines $33_1, 33_2 \ldots 33_l$, and which have an inclination of $\theta$ with respect to the X-axis in correspondence with the array of the group of memory cells at the output part. The pattern read out from the detecting unit 12 in FIG. 2 is written from the input unit 13, and is successively shifted in the X-direction by the X-directional shift lines $32_1, 32_2 \ldots 32_k$, to be stored in the memory array 14. As has been already stated, the stored pattern is shifted so that the component in the Y-axial direction is subjected to a deformation by the angle $\theta$ as seen in the figure.

When all the pattern bits are written from the input unit 13, the array 14 starts the shift of the pattern in the Y-direction by means of the Y-directional shift lines $33_1, 33_2 \ldots 33_l$. The pattern is thus shifted in the Y-direction, and is read out by the corresponding elements $34_1, 34_2 \ldots 34_l$ of the detecting unit 15. Herein, only the component of the pattern in the X-axial direction is subjected to the deformation by the angle $\theta$ this time. The pattern from the detecting unit 15 is written in the subsequent memory array 17 (refer to FIG. 1).

A detail plan of a part of the memory array 17 is shown in FIG. 4. The memory array 17 comprises a number of memory cells $41_{11}, 41_{12} \ldots 41_{ml}$ which are arrayed in the form of a matrix. Groups of memory cells forming rows in the X-direction are respectively connected in series with X-directional shift lines $42_1, 42_2 \ldots 42_m$, while groups of memory cells forming columns in the Y-direction are respectively connected in series with Y-directional shift lines $43_1, 43_2 \ldots 43_l$. The input unit 16 is connected to the Y-directional shift lines $43_1, 43_2 \ldots 43_l$, and reading elements $44_1, 44_2 \ldots 44_m$ constituting the detecting unit 18 are respectively connected to the X-directional shift lines $42_1, 42_2 \ldots 42_m$.

The pattern read out from the detecting unit 15 in FIG. 3 is written from the input unit 16, is successively shifted in the Y-direction by means of the Y-directional shift lines $43_1, 43_2 \ldots 43_l$, and is stored at predetermined positions of the memory array 17. Herein, the pattern has had the Y-directional component deformed by the angle $\theta$ by the circuit arrangement in FIG. 2, and has also had the X-directional component deformed by the angle $\theta$ by the circuit arrangement in FIG. 3, so that a rotated pattern with the original pattern rotated by $\theta$ as shown is ultimately produced in the memory array 17. The pattern is successively shifted in the X-direction by means of the X-directional shift lines $42_1, 42_2 \ldots 42_m$, and is successively read out from the detecting unit 18. The pattern read out from the memory array 17 is rewritten into the memory array 11 from the input unit 10 in FIG. 2, or is utilized for the subsequent recognition processing.

Figure 5:
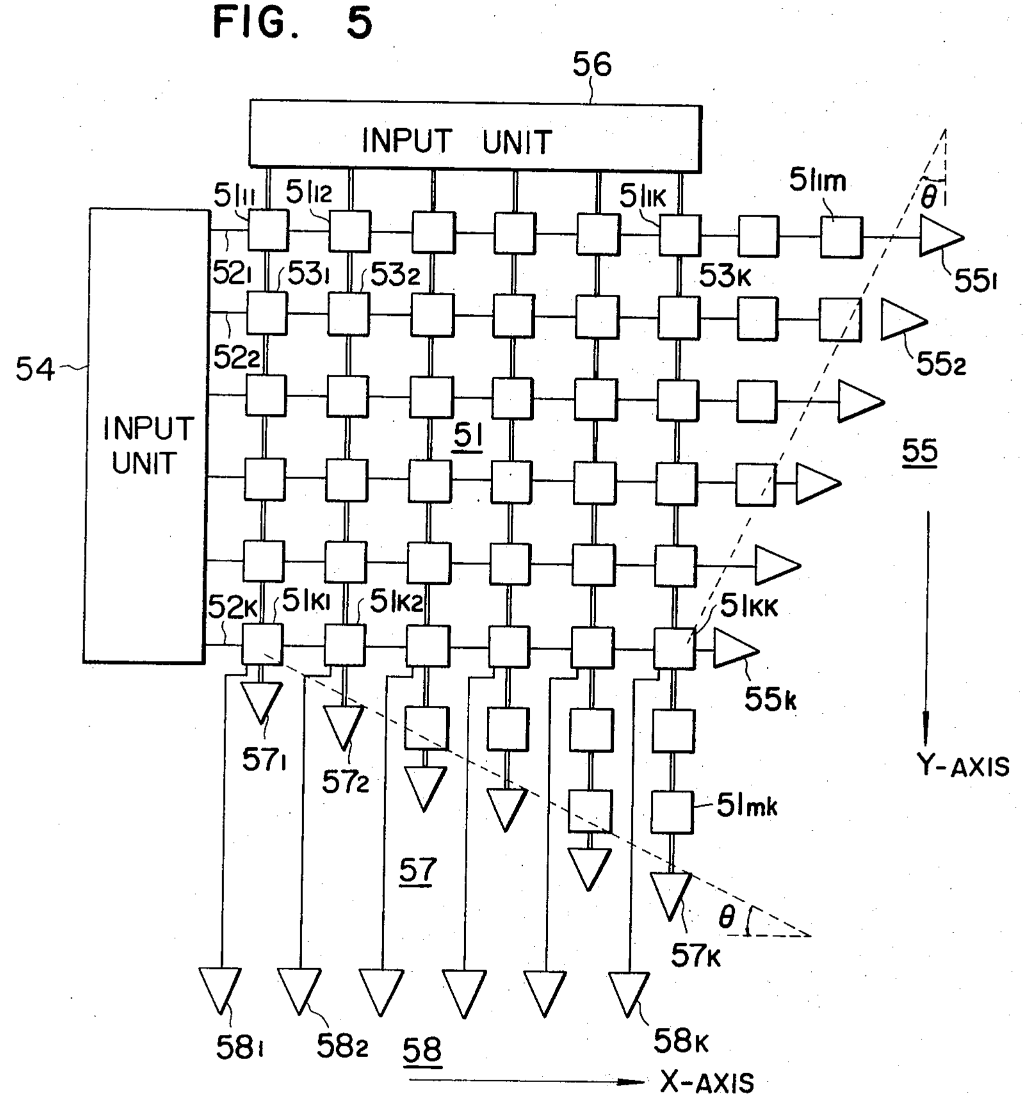
FIG. 5 is a schematic diagram explaining that the functions of the respective memory arrays shown in FIGS. 2 to 4 are constituted by a single memory array.

In order to facilitate the explanation of the invention, the rotation of the two-dimensional pattern has been described in connection with FIG. 1 as being conducted by means of three memory arrays. In actuality, however, the functions of the three memory arrays can be realized using a single memory array as illustrated in FIG. 5. Referring now to FIG. 5, a memory array 51 comprises a number of memory cells $51_{11}, 51_{12} \ldots 51_{mk}$ which are arrayed in the form of a matrix. Groups of memory cells forming rows in the X-axial direction are respectively connected in series with X-directional shift lines $52_1, 52_2 \ldots 52_k$, while those forming columns in the Y-axial direction are respectively connected in series with Y-directional shift lines $53_1, 53_2 \ldots 53_k$. The X-directional shift lines $52_1, 52_2 \ldots 52_k$ are connected at one end to an X-directional input unit 54, while they are respectively connected at the other end to reading elements $55_1, 55_2 \ldots 55_k$ constituting an X-directional detecting unit 55. On the other hand, the Y-directional shift lines $53_1, 53_2 \ldots 53_k$, are connected at one end to a Y-directional input unit 56, and are respectively connected at the other end to reading elements $57_1, 57_2 \ldots 57_k$ constituting a Y-directional detecting unit 57. The X-directional detecting unit 55 and the Y-directional detecting unit 57 have inclinations of $\theta$ with respect to the X-axis and Y-axis, respectively, in correspondence with inclined cell arrangements at the X- and Y-directional output parts of the memory array 51. Shown at 58 is a detecting unit for reading out a pattern rotated by $\theta$, and comprising reading elements $58_1, 58_2 \ldots 58_k$. The respective elements are connected to the memory cells being connected in series with an identical X-directional shift line, for example, to the memory cells $51_{k1}, 51_{k2} \ldots 51_{kk}$.

The operation of the embodiment in FIG. 5 is as follows. As in the case of FIG. 1, the original pattern is written from the X-directional input unit 54 in succession in the parallel bit system, and is stored in the memory array 51. While being shifted in the X-direction by the X-directional shift lines $52_1$, $52_2$ . . . $52_k$, the original pattern is read out from the X-directional detecting unit 55. The read pattern is again written through the input unit 54 into the memory array 51. Owing to this processing, the original pattern has only its component in the Y-axial direction subjected to a deformation of an angle $\theta$. Subsequently, while the deformed pattern is being shifted in the Y-direction in the memory array 51 by means of the Y-directional shifting lines $53_1$, $53_2$ . . . $53_k$, it is read out from the Y--directional detecting unit 57. This time, the read pattern is written through the Y-directional input unit 56 into the memory array 51 in a successive manner. Owing to the processing, the component of the pattern in the X-axial direction is subjected to a deformation of an angle $\theta$. Eventually, the pattern written from the Y-directional input unit 56 into the memory array 51 becomes translated with respect to the original pattern by being rotated by $\theta$. The pattern rotated by $\theta$ is shifted in the Y-direction in the memory array 51, and is derived through the detecting unit 58. The derived pattern is again supplied to the X-directional input unit, or is utilized for the subsequent recognition processing.

In case where the input pattern is rotated by an angle close to 90°, i.e., by 90° ± $\theta$, the processing may be made such that the input two-dimensional pattern is first written through the Y-directional input unit 56 into the memory array 51 in succession, is read out from the Y-directional detecting unit 57, is again written from the Y-directional input unit 56, and is again read out from the X-directional detecting unit 55.

As described in connection with FIG. 1 and FIG. 5, when the pattern is passed $n$ times through the memory array so as to be subjected each time to rotation by the angle $\theta$, the pattern rotated by $n \cdot \theta$ is obtained.

Figure 6:
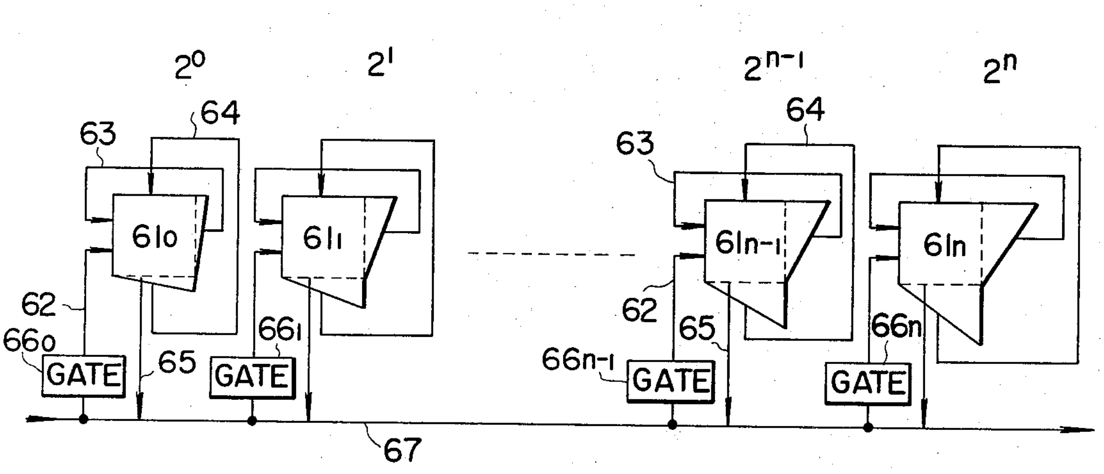
FIG. 6 is a schematic diagram explaining a rotating system in which a plurality of memory arrays, as shown in FIG. 5, are selectively combined so as to rotate an original pattern by an arbitrary angle.

FIG. 6 shows a system in which, in contrast to the above, the pattern is selectively passed through a plurality of memory arrays whose rotational angles are weighted to angles proportional to $2^n$ ($n = 0, 1 \ldots n$), so as to obtain a pattern rotated by an arbitrary angle. Referring to FIG. 6, memory arrays $61_0$, $61_1$ . . . $61_n$ are respectively constructed as has been described with reference to FIG. 5, and are respectively weighted so as to provide rotations of $2^0$, $2^1$ . . . $2^n$ degrees. Pattern input circuits 62 of the memory arrays $61_0$, $61_1$ . . . $61_n$ are respectively coupled through gate circuits $66_0$, $66_1$ . . . $66_n$ to an information bus 67, while pattern detecting circuits 65 are directly coupled to the bus 67. Numeral 63 indicates an X-directional feedback line of each memory array, and 64 a Y-directional feedback line of each memory array. The original pattern fed from the left end of the information bus 67 is selectively passed through the memory arrays corresponding to those of the gate circuits $66_0$, $66_1$ . . . $66_n$ which hold the ON stage. Then, a pattern thus rotated is transmitted from the end of the bus 67. If, accordingly, the ON and OFF states of the respective gate circuits are specified by suitable instruction signals, a combination of memory arrays of the specified weightings is selected, and a pattern rotated by an angle proportional to the summation of the weightings is obtained.

Figure 7:
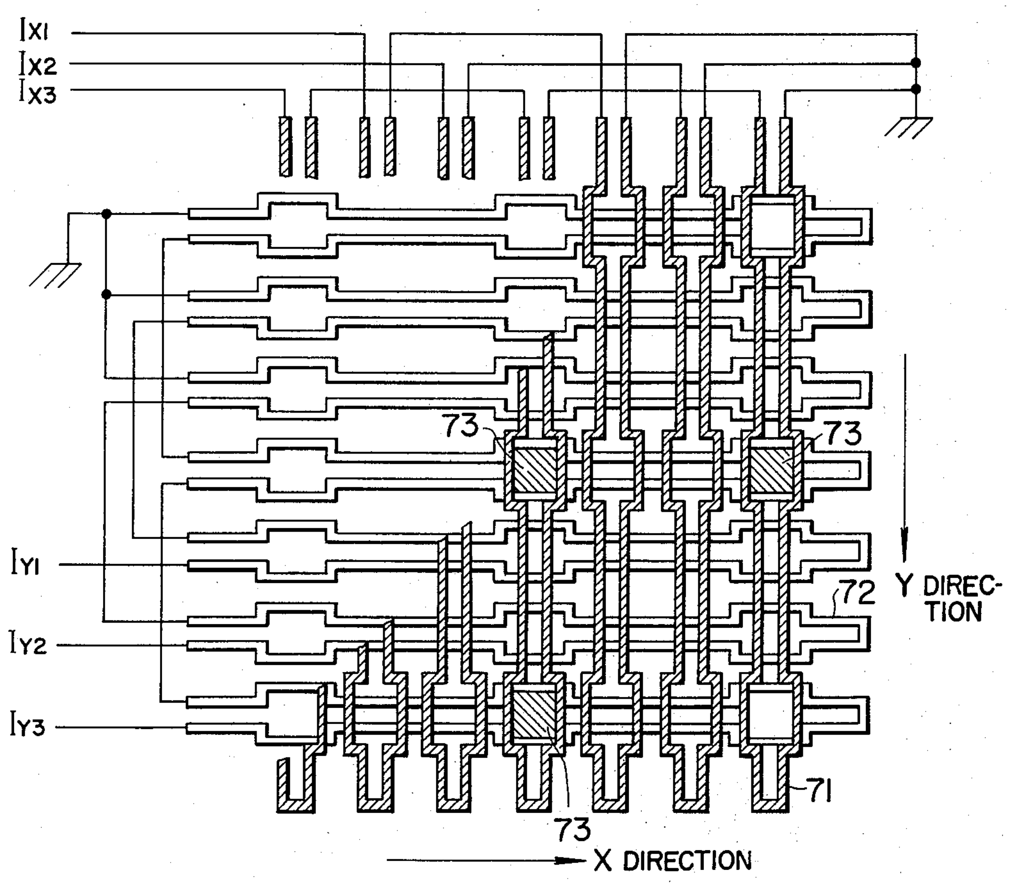
FIGS. 7 and 8 are schematic views of embodiments where the memory array used in the present invention is formed of a magnetic single wall domain device.
Figure 8:
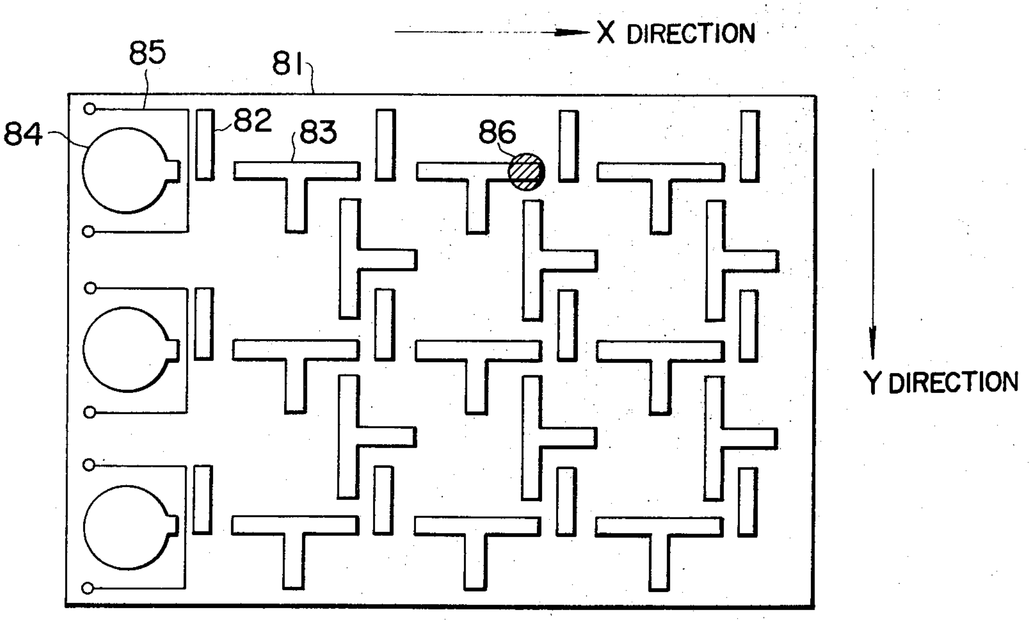

Although the memory array having the shift function in the X- and Y-directions, as illustrated in FIG. 5, is realizable by a variety of memory devices, an array can simply produce the shift function by the use of a magnetic single wall domain device. As is already known, when a perpendicular bias field is applied to the plane of a magnetic material, such as orthoferrites, exhibiting magnetic anisotropy, a cylindrical magnetic domain (magnetic bubble) is formed in the magnetic material. FIGS. 7 and 8 are schematic views of memory arrays each of which is constructed, using such a cylindrical magnetic domain device, so as to produce the shift function in both the X- and Y-directions.

Referring to FIG. 7, the array includes a current loop 71 for the X-directional shift, and a current loop 72 for the Y-directional shift. The respective current loops 71 and 72 are arranged on an array substrate (not shown) of a cylindrical magnetic domain device in a manner to be superposed through a suitable insulator. A magnetic bubble 73 is provided on the array substrate. When three-phase alternating currents $I_{x1}$, $I_{x2}$ and $I_{x3}$ are caused to flow through the X-directional current loops 71, the magnetic bubble 73 is shifted in the X-direction. Similarly, when three-phase alternating currents $I_{y1}$, $I_{y2}$ and $I_{y3}$ are caused to flow through the Y-directional current loops 72, the magnetic bubble 73 is shifted in the Y-direction. Although omitted from the drawing, magnetic bubble detectors are provided at the edges of the array in the X- and Y-directions, respectively. The arrangement of the detectors is such that, as explained in connection with FIG. 5, they are disposed at the angle $\theta$ with respect to the X- and Y-axes. At the opposite edges of the detectors, it is required to dispose bubble generators (pattern input circuits).

Referring to FIG. 8, numeral 81 indicates an array substrate of a cylindrical magnetic domain devices 82 a bar-type ferromagnetic substance film for shifting magnetic bubbles, 83 a T-type ferromagnetic substance film for similarly shifting magnetic bubbles, 84 a bubble generator, 85 a current loop for generating and inhibiting bubbles, and 86 a magnetic bubble. Now, if a rotating field rotating clockwise is applied to the array 81 of the cylindrical magnetic domain device, the magnetic bubble 86 is shifted in the X-direction. On the other hand, if a rotating field rotating counterclockwise is applied, the magnetic bubble 86 is shifted in the Y-direction. It is a matter of course that, as in the case of FIG. 7, magnetic bubble detectors are respectively arranged at the edges of the array 81 in the X- and Y-directions so as to have inclinations of $\theta$ with respect to the respective axes.

Figure 9:
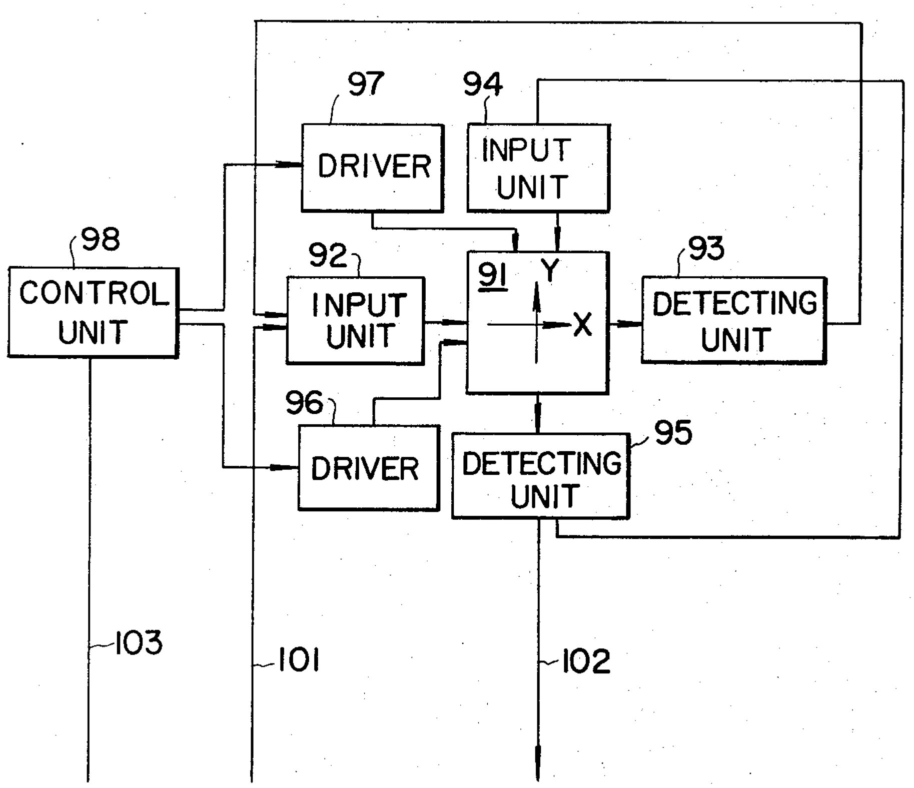
FIG. 9 is a block diagram of an embodiment of the system of the present invention.

FIG. 9 is a block diagram showing an embodiment of a spatial pattern-rotating system according to the present invention. Referring to the figure, numeral 91 represents a memory array constructed as described in connection with FIG. 5, 92 represents a pattern input unit for the X-direction, 93 represents a pattern detecting unit also for the X-direction, 94 represents a pattern input unit for the Y-direction, 95 represents a pattern detecting unit also for the Y-direction, 96 represents a shift driver for the X-direction, 97 represents a shift driver for the Y-direction, and 98 represents a control unit for supplying necessary control signals to the circuits 96, 97, etc. Reference numeral 101 designates an input line for the original pattern, 102 designates an output line for transmitting a pattern subjected to a rotating processing, and 103 designates an instruction line for feeding instruction signals, such as the angle of rotation, to the control unit 98.

The embodiment in FIG. 9 operates as described below. It is supposed that, at the beginning, the X-directional shift driver 96 is held in the operative state by a control signal from the control unit 98. In this case, the original pattern in the parallel bit system as fed to the input line 101 is successively written from the X-directional input unit 92, it is shifted in the X-direction in the memory array 91, and it is read out from the X-directional detecting unit 93. The read pattern is again written through the input unit 92 into the memory array 91. As has been stated with reference to FIG. 5, the component of the original pattern in the Y-axial direction is subjected to a deformation by an angle $\theta$ by this processing operation.

Next, the circuit arrangement is changed over by a control signal from the control unit 98 so that only the Y-directional shift driver 97 may hold the operative state. The pattern in the memory array 91 is accordingly shifted in the Y-direction, to be read out from the Y-directional detecting unit 95. The read pattern is written through the Y-directional input unit 94 into the memory array 91 this time. As has been described in connection with FIG. 5, the component of the pattern in the X-axial direction is subjected to deformation by an angle $\theta$ by the processing operation. Eventually, a pattern with the original pattern generally rotated by $\theta$ is stored in the array 91.

The pattern rotated by $\theta$ is read out from the Y-directional detecting unit 95 to the output line 102 in successive manner. Assuming now that an instruction signal giving rise to a rotation of $n\cdot\theta$ is supplied to the instruction line 103, the pattern read out at the output line 102 is supplied to the X-directional input unit 92, and thereafter, the foregoing operation is repeated $n$ times under the control of the control unit 98.

The block arrangement in FIG. 9 can also be applied to the system in FIG. 6. In this case, the control unit 98 brings a set of specified gate circuits (refer to FIG. 6) into the ON state by a rotational angle-instructing signal fed to the instruction line 103, whereby a group of memory arrays of weightings corresponding to the instruction signal are selected.

It should be noted that, as apparent from the explanation thus far made, the rotating system for a two-dimensional pattern according to the present invention is based on a coordinate transform processing expressed by the following equations:

$$x' = y - y \tan \theta \qquad (1)$$

$$y' = y + x \tan \theta - y \tan^2\theta \qquad (2)$$

$(x', y')$ represents coordinates after the transformation (after the rotation), while $(x,y)$ those of the original pattern. $\theta$ denotes the angles of the X- and Y-directional detecting units with respect to the respective axes.

Herein, it will be easily understood that "$-y \tan^2\theta$" in the above-mentioned equation (2) is the term of a distortion for the coordinate rotation. Accordingly, it is in the vicinity of $\theta = 1.0$ radian that the distortion of a figure becomes maximum in the coordinate transform expressed by equations (1) and (2), and the distortion abruptly becomes small at both ends thereof. In general, $n \tan^2 \theta < \tan^2 n\cdot\theta$ holds in a range in which $\theta$ is small. Therefore, in order to conduct a figure rotation of a small distortion, a better rotated pattern is obtained by employing the system in FIG. 5 to pass the pattern through the rotating array of a minute rotating angle $\theta$ a plurality of times, than with the rotating array-selecting system shown in FIG. 6.

With extremely small-scale bit matrices as in the memory arrays in FIGS. 2 through 5 and used for the explanation of the principle of the rotating system according to the present invention, the distortion of a figure attendant upon the digital type rotation becomes large. In the case, however, where a memory array having several hundreds $x$ several hundreds of memory cells is used, the distortion of a figure due to the digital rotation is naturally negligible.

As described above, according to the spatail pattern-rotating system of the present invention, the rotating processing of a figure (two-dimensional pattern) as has hitherto been nearly impossible in the course of the pattern recognition processing can be performed at high speed, at relatively low cost, and at high reliability.

What is claimed is:

1. An arrangement for normalizing a two-dimensional pattern, comprising a memory array for storing a two-dimensional information pattern, first information input means provided along the Y-axis of said memory array for writing a parallel bit train signal representing said two-dimensional information pattern into said array, first detecting means provided on said memory array opposite to said first input means and inclined by an angle of $\theta$ with respect to said Y-axis for detecting said information pattern, first driver means for controlling said memory array to selectively shift the parallel bit train signal corresponding to said two-dimensional pattern from said first input means along the memory array in the X and Y coordinate directions, and control means for writing the output of said first detecting means into said first input means so as to repeatedly write said pattern into said memory array and to read out said pattern from said first detecting means, whereby a pattern rotated with respect to the input two-dimensional pattern is obtained from said first detecting means.

2. An arrangement for normalizing a two-dimensional pattern according to claim 1, further comprising second input means arranged along said X-axis of said memory array for writing a parallel bit train signal into said array, and second detecting means provided on said memory array opposite to said second input means and inclined at an angle $\theta$ with respect to said X-axis, said control means including means to repeatedly apply the output of said second detecting means to said second input means and means to read out the written pattern from said second detecting means.

3. An arrangement for normalizing a two-dimensional pattern according to claim 2, further comprising means for repeatedly applying the output of said second detecting means to said first input means, whereby a pattern rotated by an angle of $n\ \theta$ is obtained by repeating the same operation $n$ times.

4. An arrangement for normalizing a two-dimensional pattern according to claim 1, wherein said memory array comprises a magnetic single wall domain device in which current loops for the X-directional shift and current loops for the Y-directional shift are formed on a substrate of a magnetic material having magnetic anisotropy.

5. An arrangement for normalizing a two-dimensional pattern according to claim 1, further comprising second input means arranged along said X-axis of said memory array for writing a parallel bit train signal into said array, second driver means for controlling said memory array to write the parallel bit train signal corresponding to said two-dimensional pattern from said second input means into said memory array and to read out said pattern from said second detecting means, said control means including means to repeatedly write the output of said second detecting means into said second input means so that it can be transferred into said memory array and read out from said first detecting means, whereby a pattern with the input two-dimensional pattern rotated by $90° \pm \theta°$ is obtained from said first detecting means.

6. An arrangement for normalizing a two-dimensional pattern according to claim 1, wherein said memory array comprises a magnetic single wall domain device in which T-bar patterns are formed on a substrate of a magnetic material having a magnetic anisotropy, said patterns having a configuration in which a single wall domain within said substrate can be shifted in said X-direction for a rotating field in one direction in a plane on said substrate, while it can be shifted in said Y-direction for a rotating field in the opposite direction.

7. An arrangement for normalizing a two-dimensional pattern, comprising:

- a plurality of stages each of which comprises a memory array for storing a two-dimensional information pattern, a first input unit provided along the Y-axis of said memory array, a first detecting unit provided on said array at a predetermined angle with respect to said first input unit, a second input unit provided along the X-axis of said memory array, a second detecting unit provided on said array at a predetermined angle with respect to said second input unit, a third detecting unit arranged in parallel with said second input unit, means to apply an output of said first detecting unit to said first input unit, and means to read out the written information from said second detecting unit, and apply the output to said second input unit, and means to read out the information from said third detecting unit, said angles defined by the corresponding input units and detecting units being selectively different for the respective stages;
- a bus common to said plurality of stages;
- a plurality of gates;
- means to couple said first input unit of each stage and said bus through a respective gate;
- means to couple said third detecting unit of each state and said bus; and
- means to selectively control the ON and OFF states of said gates in dependence on an angle by which said two-dimensional pattern inputted from one end of said bus is to be rotated.

8. An arrangement for normalizing a two-dimensional pattern according to claim 7, wherein said memory array comprises a magnetic single wall domain device in which current loops for the X-directional shift and current loops for the Y-directional shift are formed on a substrate of a magnetic material having magnetic anisotropy.

9. An arrangement for normalizing a two-dimensional pattern according to claim 7, wherein said memory array comprises a magnetic single wall domain device in which T-bar patterns are formed on a substrate of a magnetic material having magnetic anisotropy, said patterns having a configuration in which a single wall domain within said substrate can be shifted in said X-direction for a rotating field in one direction in a plane of said substrate, while it can be shifted in said Y-direction for a rotating field in the opposite direction.

10. An arrangement for normalizing a two-dimensional pattern, comprising:

- a memory array for storing a two-dimensional information pattern,
- an X-directional input unit for writing a parallel bit signal into said memory array in an X-direction,
- an X-directional detecting unit arranged opposite to said X-directional input unit and inclined by a predetermined angle with respect thereto,
- a Y-directional input unit for writing a parallel bit signal into said memory array in a Y-direction,
- a Y-directional detecting unit arranged opposite to said Y-directional input unit and inclined by a predetermined angle with respect thereto,
- two drivers for successively shifting the information in said array in said X-direction and Y-direction in parallel, said information being written from said X-directional input unit and said Y-directional input unit, respectively,
- means to feed-back outputs of said X-directional detecting unit and said Y-directional detecting unit to said X-directional input unit and said Y-directional input unit, respectively, and
- control means to selectively operate one of said drivers.

11. An arrangement for normalizing a two-dimensional pattern according to claim 10, wherein said memory array comprises a magnetic single wall domain device in which current loops for the X-directional shift and current loops for the Y-directional shift are formed on a substrate of a magnetic material having magnetic anisotropy.

12. An arrangement for normalizing a two-dimensional pattern according to claim 10, wherein said memory array comprises a magnetic single wall domain device in which T-bar patterns are formed on a substrate of a magnetic material having magnetic anisotropy, said patterns having a configuration in which a single wall domain within said substrate can be shifted in said X-direction for a rotating field in one direction in a plane of said substrate, while it can be shifted in said Y-direction for a rotating field in the opposite direction.

13. An arrangement for normalizing a two-dimensional pattern, comprising

- a memory array consisting of a plurality of memory elements disposed in a matrix of coordinate lines and columns for storing a two-dimensional pattern,
- first information input means provided along one side of said memory array for writing a parallel bit train signal representing said two-dimensional information pattern into the lines of said array, 9 first detecting means provided on the side of said memory array opposite said input means and inclined by an angle $\theta$ with respect to said first information input means, the number of memory elements in said lines between said first information input means and said first detecting means varying as a result of said inclination, first driver means for controlling said memory array to selectively shift the parallel bit train signal corresponding to said two-dimensional pattern from said first input means along the lines of said memory array, and control means for writing the output of said first detecting means into said first input means so as to repeatedly write said pattern into said memory array, whereby a pattern rotated with respect to the input two-dimensional pattern may be obtained from said first detecting means.

14. An arrangement for normalizing a two-dimensional pattern according to claim 13, further comprising second input means disposed along a third side of said array for writing a parallel bit train signal into the columns of said array, and second detecting means disposed on the side of said memory array opposite said second input means and inclined by an angle $\theta$ with respect to said second input means, the number of memory elements in said lines between said second input means and said second detecting means varying as a result of said inclination, said control means including means to repeatedly apply the output of said second detecting means to said second input means.

15. An arrangement for normalizing a two-dimensional pattern according to claim 14, further comprising means for repeatedly applying the output of said second detecting means to said first input means, whereby a pattern rotated by an angle of $n\,\theta$ is obtained by repeating the same operation $n$ times.

* * * * *